May 30, 1939.                V. M. CRUIKSHANK                2,160,381
                              HEAT CONTROL SYSTEM
                           Filed Dec. 21, 1935          2 Sheets-Sheet 1

INVENTOR.
V. M. Cruikshank
BY
Clark & Ott
ATTORNEYS

May 30, 1939.   V. M. CRUIKSHANK   2,160,381
HEAT CONTROL SYSTEM
Filed Dec. 21, 1935   2 Sheets-Sheet 2

INVENTOR.
V. M. Cruikshank
BY Clark & Ott
ATTORNEYS

Patented May 30, 1939

2,160,381

UNITED STATES PATENT OFFICE 2,160,381

HEAT CONTROL SYSTEM

Virginius M. Cruikshank, Sunbury, Pa.

Application December 21, 1935, Serial No. 55,544

2 Claims. (Cl. 236—37)

This invention relates to heat control systems and aims for its broad object to provide an improved apparatus for controlling a source of heat so as to maintain within an enclosure which is heated thereby, a more uniform and constant temperature so as to avoid wide variations in temperature incident to the common "on and off" control systems.

More particularly, the invention resides in an apparatus of the indicated character which embodies circuit including an electrically actuated means for governing the operation of a source of heat, and a pair of thermo-sensitive devices in said circuit one of which is responsive to the variations of the enclosure temperature and the other of which is responsive to the variations of the temperature of the heat which is generated by the heat source and in which each of said devices includes a plurality of switch contacts, the contacts of one being complementary to those of the other so as to cooperatively function to open and close the circuit in response to a combination of the temperatures registered at the several points of control.

The invention also comprehends a dual control for opening and closing a circuit at separate points by means of a pair of thermo-sensitive switch units, which units are responsive to temperatures developed at different locations and each of which units embodies a common contact element connected with said circuit and a set of contact elements in which the set of contact elements of one unit are adapted to successively engage with the common contact thereof in response to predetermined decrements of temperature, while the set of contact elements of the other unit are adapted to successively disengage the common contact therefor in response to predetermined increments of temperature together with conductors respectively connecting the set of contact elements of one unit with those of the other in the inverse order of their arrangement.

As a further feature, the invention provides a thermo-sensitive switch unit which includes in a circuit to be controlled thereby, a set of contact elements adapted to be controlled either by a common thermo-sensitive actuator or separate thermo-sensitive actuators for each contact element, whereby the circuit is closed in response to either predetermined increments or decrements of temperature and wherein a pressure limit control is utilized to independently make or break the circuit in accordance with the decrease or increase of the pressure of a heating medium.

The invention furthermore contemplates in a device of the indicated character, means for regulating the increments or decrements of temperature at which the switch elements will function.

Other objects in view are to provide apparatus of the indicated character which is not unduly complicated in its construction or mode of operation, which may be economically produced, installed and maintained in working condition and which is reliable and efficient in its purpose.

With the above and other objects in view, reference is now made to the following specification and accompanying drawings in which there has been disclosed, by way of example, several preferred embodiments of the invention, while the appended claims cover variations and modifications which fall within the scope of the invention.

Figure 1:
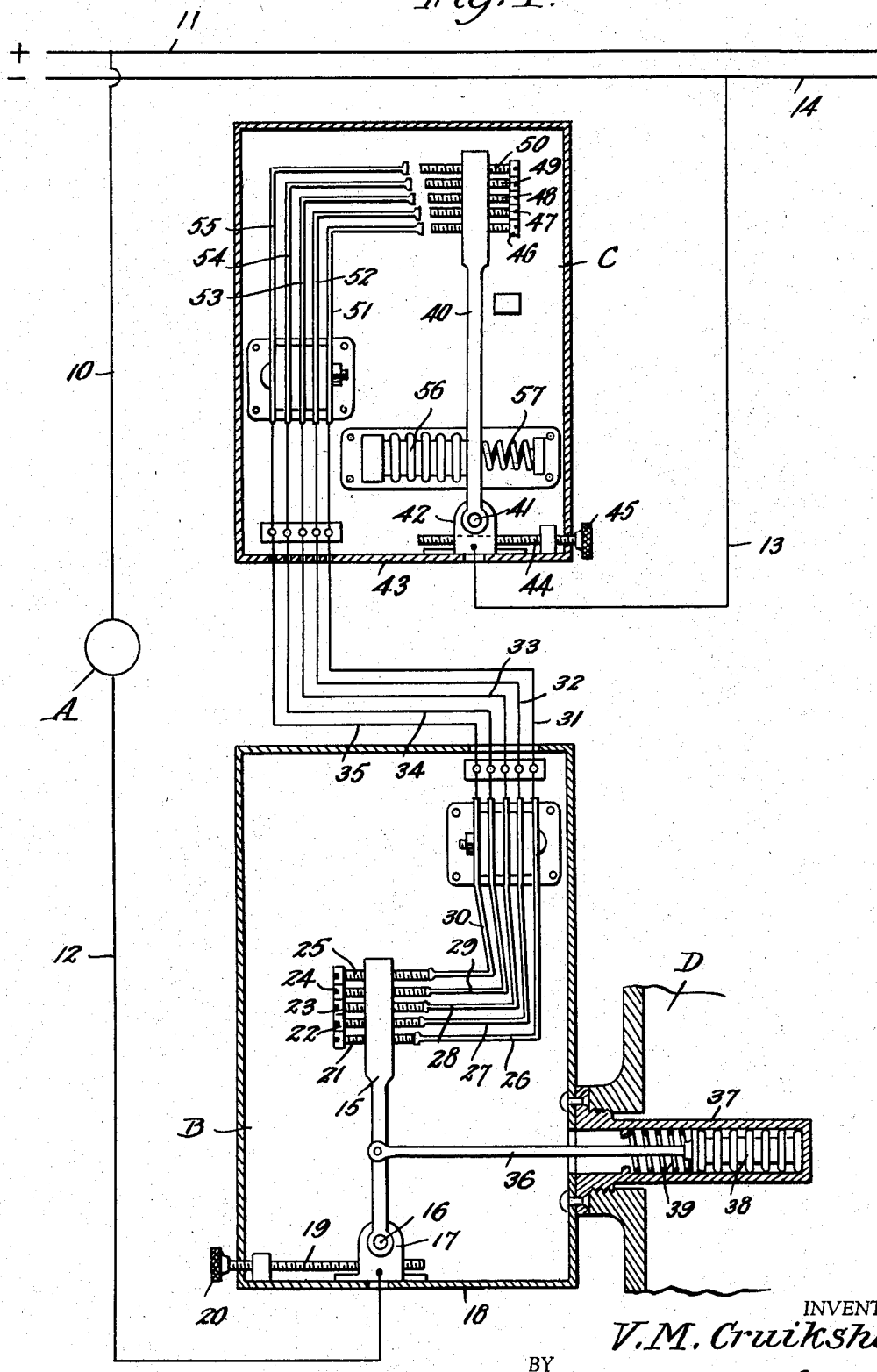
Fig. 1 is a diagrammatic view of a heat source control apparatus constructed in accordance with one form of the invention.

Referring to the drawings by characters of reference, in the form of the invention illustrated in Fig. 1, A designates an apparatus for controlling a source of heat which may be an electric motor for operating the feed of the fuel, an electric device for actuating a damper or dampers, a relay or any other equivalent device for controlling a heat source in any desired manner to decrease or increase the heat which is developed by said heat source to heat an enclosure whether it be steam, hot water, hot air or an equivalent heating medium. The motor or other electrical device A is connected by a conductor wire 10 to a current feed wire 11 and is connected by a second conductor 12 to one of a pair of thermo-sensitive circuit opening and closing devices or units B, the other of said devices C being connected by a conductor 13 to the other feed wire 14.

In order to demonstrate one of the principal uses of the invention, it will be assumed that the device C is located in a room or enclosure which is to be heated by the source of heat controlled by device A, while the device B is located adjacent the boiler D of the furnace which constitutes the source of heat. The device B is in the nature of a switch including a common contact arm 15 fulcrumed on a pivot 16 to a bracket 17 which is adjustably carried by the casing 18 of the device or unit B, the adjustments being made by threaded stem 19 having a manipulating knob 20 for shifting the bracket 17 upon rotation of the stem 19. The common switch arm 15 is provided with five individually adjustable screw contacts 21, 22, 23, 24 and 25. The conductor 12 is electrically connected with the bracket 17 and through the pivot and arm 16, the current will be conveyed to the contact screws 21 to 25 inclusive. The device or unit B further includes a plurality of resilient switch contact arms 26, 27, 28, 29 and 30 insulated from each other and supported within the casing 18 with conductor wires 31, 32, 33, 34 and 35 leading therefrom to the device or unit C. The common contact arm 15 is swung on its fulcrum by a connecting rod 36 which in turn is actuated by a thermo-sensitive element 37 which includes a bellows type thermostat 38 for shifting the connecting rod 36 to the left when the element is expanded, while a spring 39 functions to shift the rod 36 to the right as the bellows thermostat 38 contracts.

The thermo-sensitive element 37 in the present instance is of the immersion type and is located in the boiler D of the furnace so that the switch unit or device B is actuated in response to predetermined increments of temperature developed in the boiler D. While the thermo-sensitive element 37 is described in the present instance as being immersed in the boiler D, it is obvious that within the scope of the invention the same may be installed in the flue stack, in a radiator or at any other desired place where it is responsive to variations of the temperature of the heat developed by the source. It is also to be understood within the scope of the invention that the actuation of the switch arm 15 may be effected by a pressure operated means which is controlled by the variations in the pressure developed by the heat source in lieu of the thermo-sensitive device 37. In any event, it is to be understood that increases in the heat developed by the heat source will successively and in predetermined stages move the contact screws 21 to 25 out of engagement with the corresponding resilient contact arms 26 to 30 inclusive. The arrangement is such that the initial swinging of the switch arm 15 to the left disengages the lowermost contact screw 21, while the resiliency of the remaining contact arms 27, 28, 29 and 30 retain them in engagement with the contact screws 22, 23, 24 and 25. The next stage of the swinging movement of the contact arm 15 to the left disengages the contact screw 22 from the resilient contact arm 27, while the remainder remain in engagement, etc.

The unit or device C which is installed in the enclosure, includes a common contact arm 40 which is fulcrumed by a pivot 41 on a bracket 42 which is adjustably mounted on the casing 43 of the device C and is shifted by a threaded stem 44 having a manipulating knob 45. The common contact arm 40 is provided with five screw contacts 46, 47, 48, 49 and 50 which are individually adjustable in the arm terminal. The conductor 13 is connected with the bracket 42 and conveys the current through the arm 40 to the several screw contacts 46 to 50. The unit C also includes a plurality of resilient contact arms 51, 52, 53, 54 and 55 having their free ends respectively aligned with the screw contacts 46 to 50, while the opposite ends of said resilient contacts are insulated from each other and secured within the casing 43, the conductors 31 to 35 being respectively connected with the resilient contacts 51 to 55 inclusive. The swinging of the common contact arm 40 is controlled by a thermo-sensitive device 56 and an opposed spring 57, it being apparent that decrements in the temperature of the enclosure will cause the thermo-sensitive device 56 to contract whereby the spring 57 will swing the common contact arm 40 to the left. As the temperature in the enclosure decreases in successive stages, the usual movement of the common contact arm 40 to the left will cause the screw contact 46 to engage the resilient contact 51, while the remaining screw contacts 47 to 50 will remain out of engagement with the other resilient contacts 52 to 55. A further decrease in the enclosure temperature will cause the common contact arm 40 to move further to the left whereby the screw contact 47 will engage with the resilient contact 52 and obviously further decreases in the enclosure temperature will eventually effect the engagement of all of the screw contacts with the resilient contacts.

Assuming that the device or unit B is connected with and responsive to a heating boiler wherein the temperature ranges from 100° to 180°, thereby providing a spread or range of 80° with the five contact points adjusted so as to divide this temperature spread or range into five zones of 16° each and assuming that at 70° the device or unit C will be so adjusted that the five contact points will all be open, the device operates as follows:

When the room temperature drops slightly below 70°, for instance, a fifth of a degree, the common contact arm 40 will swing to the left and the contact screw 46 will engage the resilient contact 51, thereby completing the circuit from wire 14, conductor 13, bracket 42, switch arm 40, screw contact 46, resilient contact 51, conductor 31 to resilient contact 26 in device B. If the temperature in the boiler is below 116°, the screw contact 21 will be in engagement with the resilient contact 26, and the circuit will be further completed through common switch arm 15, bracket 17, and conductor 12 to device A. The device A will then operate and continue to operate until the temperature developed by the heating source is raised to 116° at which temperature the thermo-sensitive device 37 will swing the common contact arm 15 to the left so as to disengage screw contact 21 from resilient contact 26 to break the circuit and discontinue the operation of heat source control device A. If the heat developed by the heat source at a temperature of 116° is not sufficient to raise the enclosure temperature to 70° and the enclosure temperature drops another fifth of a degree, the thermo-sensitive device 56 by further contracting will cause the spring 57 to swing to common contact arm 40 of device C, further to the left thereby engaging screw contact 47 with resilient contact 52 and thus complete the circuit from resilient contact 52, conductor 32, resilient contact 27 of device B, screw contact 22, common switch arm 15, bracket 17, conductor 12 to heat source controlling device A which will then operate until the heat developed by the heat source reaches a temperature of 132° at which temperature switch arm 15 will be swung further to the left by the thermo-sensitive device 37 to break the circuit and discontinue the operation of device A. In a similar manner, if the heat developed by the heat source fails to raise the enclosure temperature to 70° and as the enclosure temperature drops in fifths of degrees, the remaining contacts will successively close the circuit to the device A until the heat developed by the heat source is sufficient to maintain a temperature of 70° in the enclosure. It is, of course, obvious that when the heat developed by the heat source raises the enclosure temperature to 70°, all of the contacts in device C will be broken to open the circuit. It is, therefore, apparent that the device effects a properly modulated control thus dividing the heat into various steps or zones which eliminates the wide variations in temperature which are incident to the common "on and off" control systems.

It will also be observed that the resilient contacts of the device B are connected with the resilient contacts of the device C in inverse order as the contacts of device C are normally out of engagement and successively brought into engagement by predetermined decreases in the temperature in the enclosure, while the contacts of device B are normally in contact and move out of contact by increases in the heat developed by the heat source.

Figure 2:
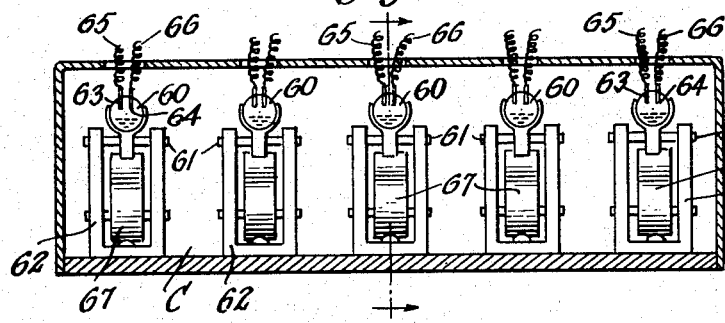
Fig. 2 is a longitudinal sectional view through a switch unit constructed in accordance with another form of the invention.
Figure 3:
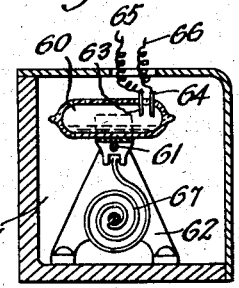
Fig. 3 is a transverse sectional view therethrough taken approximately on the line 3—3 of Fig. 2.

In Figs. 2 and 3 of the drawings there is disclosed a modified form of the thermo-sensitive device or unit C which is responsive to variations in the enclosure temperature. In this form, a plurality of mercury tube switches 60 are utilized, each of which is pivoted as at 61 in a supporting frame 62 and each of which includes a pair of contacts 63 and 64 from which conductors 65 and 66 respectively lead. Each switch is individually controlled by thermo-sensitive coils 67 which coils respectively function between successive temperature ranges to tilt the tubes for bridging the contacts 63 and 64. The mercury tube contact switches 60 correspond with and function in a manner similar to the screw contacts 46 to 50 and resilient contacts 51 to 55 of the unit C of the form of the invention shown in Fig. 1.

Figure 4:
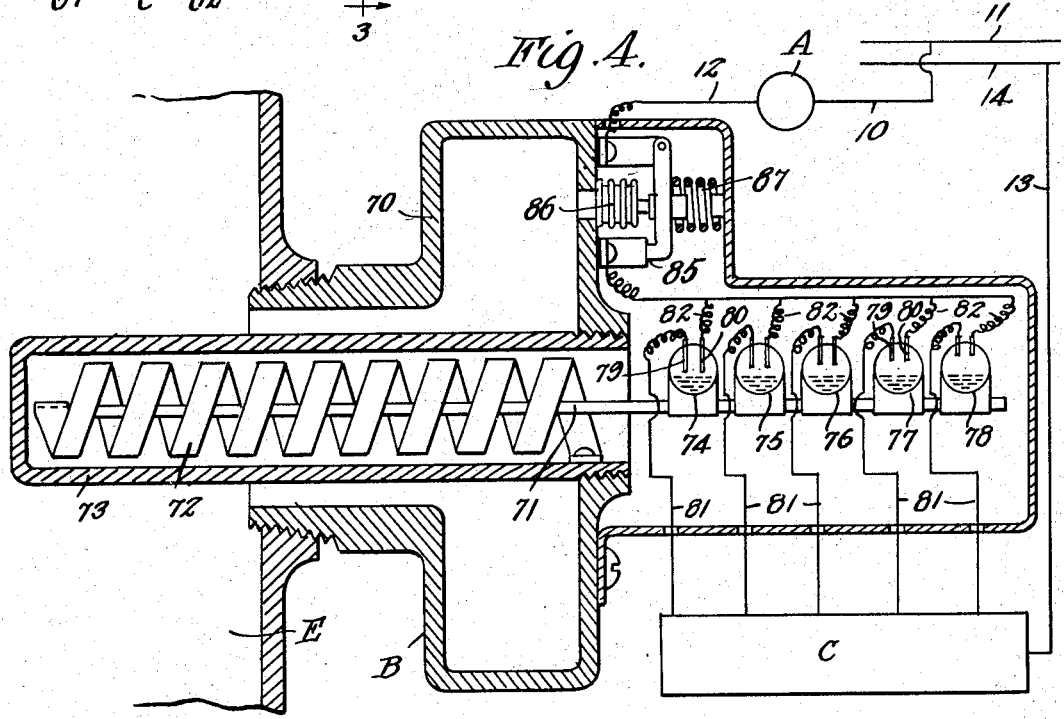
Fig. 4 is a longitudinal sectional view of a switch unit constructed in accordance with another form of the invention.
Figure 5:
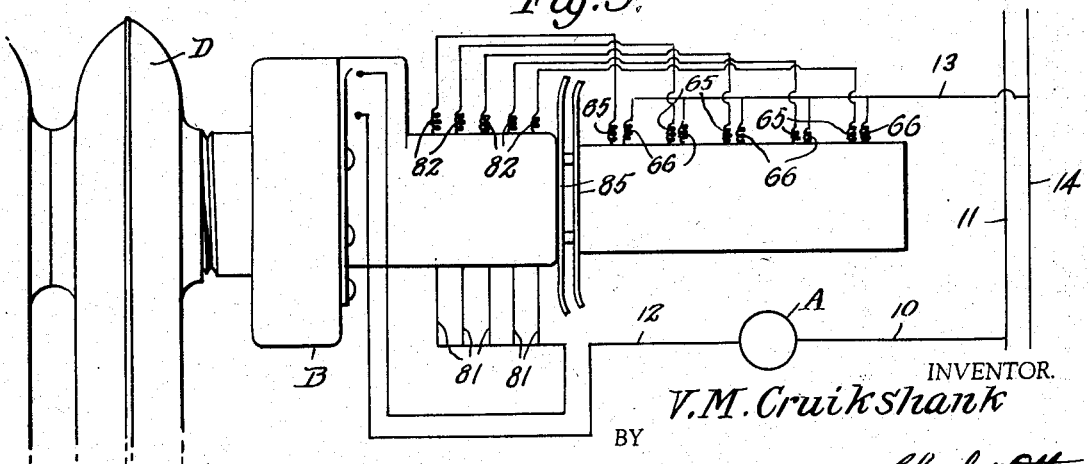
Fig. 5 is a diagrammatic view illustrating a combination mounting of the forms of the switch units disclosed in Figs. 2 and 4.

In the form of the invention illustrated in Fig. 4 of the drawings, a unit or device B is disclosed which is the equivalent of the unit or device B of the form of the invention shown in Fig. 1 of the drawings. In this instance, the device or unit B includes a casing 70 which is threadedly engaged with and is in open communication with a radiator E of a vapor or steam heating system. The casing has mounted therein a rotary shaft 71 adapted to be turned by a coiled thermo-sensitive element 72 which is enclosed in a well 73 extending into the radiator. The shaft 71 has mounted thereon for turning movement therewith, a plurality of mercury tube switches 74, 75, 76, 77 and 78, which are set in a position to normally bridge the spaced contacts 79 and 80 of each switch, but which are adapted to successively open the circuit between the contacts thereof in accordance with predetermined temperature changes. The devices or units B and C may be mounted together as shown in Fig. 5 of the drawings to control the operation of the heat source through an electrical controlling device A from which a conductor 10 leads to one wire 11 of a source of supply. A conductor 12 leads from said device A and is connected in parallel with conductors 81 leading to the contacts 79 of the mercury tube switches 74 to 78 inclusive of the unit B.

The contacts 80 of the mercury tube switches of said circuit B are connected by circuit wires 82 to the conductors 65 of the mercury tube switches 60 of the unit C, while the conductors 66 of said switches 60 are connected in parallel with a conductor 13 leading to the other wire 14 of the source of supply. The units B and C have installed therebetween spaced baffle plates 85 to insulate the unit C from the unit B so that the unit C operates in variation of the temperature in the room or enclosure to be heated, while the unit B operates on the temperature of the circulating medium in the radiator, located in the enclosure to be heated.

The unit or device B shown in Fig. 4 may be provided with a pressure limit control which includes a switch 85 located in the circuit wire 12 and in series with the device A and adapted to be opened by a pressure actuated element 86 to break the circuit in event the pressure of the heating medium developed by the heat source exceeds a predetermined amount. A spring 87 opposes the pressure actuated element 86 to maintain the switch in closed condition until the predetermined temperature is reached. This provides a safety device for use in connection with the system.

What is claimed is:

1. A regulator for the heat generating source of a heating system having a radiator installed in an enclosure to be heated thereby, said regulator comprising an electrical circuit including a pair of thermo-sensitive switch units each including a plurality of pairs of switch contacts corresponding in number, with one contact of each pair of each unit respectively connected to one contact of each pair of the other unit, and the remaining contacts of each unit connected in parallel respectively with opposite sides of the source of current supply, the said units being mounted on a radiator and insulated from each other so that one unit is responsive to temperature variations in the radiator and the other is responsive to temperature variations of the room to cooperatively function to close the circuit and to independently function to open the circuit.

2. In a control system for a heat source having an electrically actuated device for controlling the operation thereof, a circuit including said device and a pair of thermo-sensitive circuit opening and closing members arranged in series in said circuit and respectively responsive to the heat generated by the heat source and the heat of an enclosure heated by said source, one of said members comprising a plurality of normally opened switches and a thermo-sensitive element responsive to predetermined temperature drops of said heat of said enclosure to successively close the switches respectively and to retain in closed condition the switches previously closed, a second circuit control member comprising a plurality of switches normally closed and a thermo-sensitive element responsive to predetermined successive temperature increases in the heat generated by said heating unit to successively open the switches respectively of the second circuit control member and to retain in opened condition the switches previously opened, and means connecting said switches of the first circuit control member in the order in which they are successively closed to the switches of the second circuit control member in the order in which they are successively opened whereby as the temperature of the heating unit decreases the switches in the second circuit control member will successively close in the inverse order of opening while upon increase in heat of said enclosure the switches in the first circuit control member will successively open in the inverse order of closing to maintain a substantially uniform temperature in the enclosure heated by said source.

VIRGINIUS M. CRUIKSHANK.